United States Patent [19]
Bettencourt

[11] Patent Number: 4,736,963
[45] Date of Patent: Apr. 12, 1988

[54] TOW BAR FOR A THREE-WHEELED VEHICLE

[76] Inventor: Edward J. Bettencourt, 1324 Villa Manucha, Newman, Calif. 95360

[21] Appl. No.: 820,179

[22] Filed: Jan. 21, 1986

[51] Int. Cl.$^4$ .............................................. B60D 1/14
[52] U.S. Cl. .............................. 280/460 R; 280/292; 280/491 D
[58] Field of Search ................... 280/400, 402, 415 R, 280/415 A, 46, 204, 292, 460 R, 476 A, 478 B, 491 D, 491 E, 491 R, 493; 224/42.03 R, 42.03 B, 42.08

[56] References Cited

U.S. PATENT DOCUMENTS

| | | | |
|---|---|---|---|
| 704,871 | 7/1902 | Davis | 280/292 |
| 2,212,480 | 8/1940 | Rodin | 280/493 |
| 2,789,832 | 4/1957 | Zumwalt | 280/292 |
| 3,510,146 | 5/1970 | Hartman | 280/491 E |
| 4,111,449 | 9/1978 | Hancock | 280/292 |
| 4,471,973 | 9/1984 | Beckmann | 280/204 |
| 4,592,564 | 6/1986 | Warnock | 280/292 |

FOREIGN PATENT DOCUMENTS

| | | | |
|---|---|---|---|
| 1283100 | 11/1968 | Fed. Rep. of Germany | 280/491 E |
| 438701 | 5/1912 | France | 280/204 |
| 1265482 | 3/1972 | United Kingdom | 280/493 |

*Primary Examiner*—John J. Love
*Assistant Examiner*—Everett G. Diederiks, Jr.

[57] ABSTRACT

This tow bar is designed for towing a three-wheeled automotive vehicle and is foldable for storage. Primarily, it consists of a main body receiving a ball hitch, and a sleeve is provided on each side of the main body and freely receives the threaded ends of a pair of rods provided with a hook at each end that is received on the fork of the front wheel of the vehicle.

4 Claims, 1 Drawing Sheet

TOW BAR FOR A THREE-WHEELED VEHICLE

BACKGROUND OF THE INVENTION

1. Field of the Invention

This invention relates to towing devices, and, more particularly, to a tow bar for a three-wheeled vehicle.

2. Description of Prior Art

Tow bars are known in the art and are various types. The tow bar, in accordance with the present invention, will enable a person to easily tow a three-wheeled automotive vehicle when desired, and it includes a yoke with hook means for attachment to the front of the three-wheeled vehicle.

The principal object of this invention is to provide a tow bar for a three-wheeled vehicle, which will be unique, in that it will employ folding means.

Another object of this invention is to provide a tow bar for a three-wheeled vehicle, which will be of such design, as to have a pair of rods that are pivotal in sleeves welded to a main body, and the assembly forms a folding yoke for reception of the front wheel of the vehicle.

SUMMARY OF THE INVENTION

A tow bar for a three-wheeled vehicle, comprising a yoke assembly, including a pair of rods for engaging with the front wheel of an automotive vehicle, and the main body of the assembly includes a pair of sleeves in which the rods are received.

DETAILED DESCRIPTION

Figure 1:
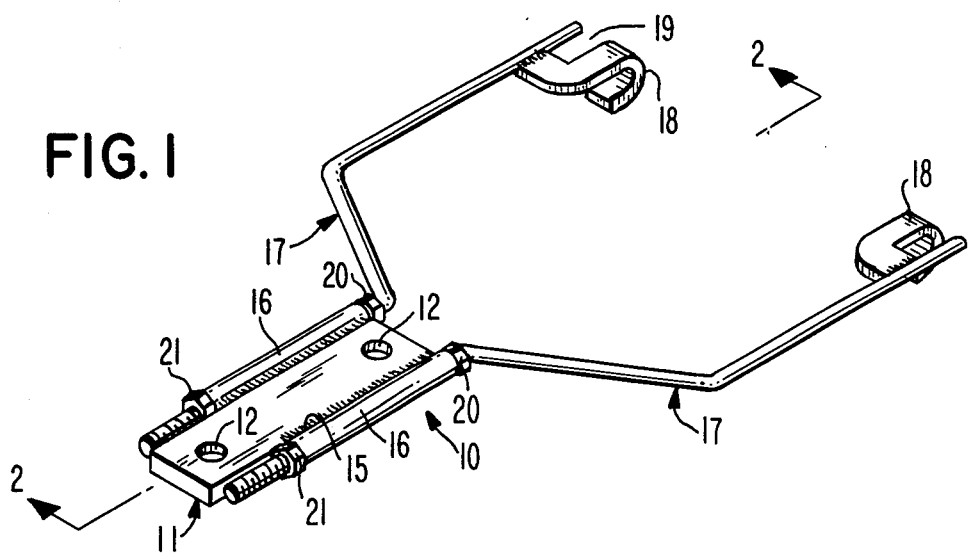
FIG. 1 is a perspective view of the present invention.
Figure 2:
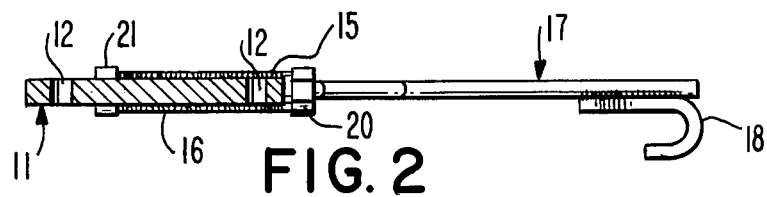
FIG. 2 is a cross-sectional view, taken along the line 2—2 of FIG. 1.
Figure 3:
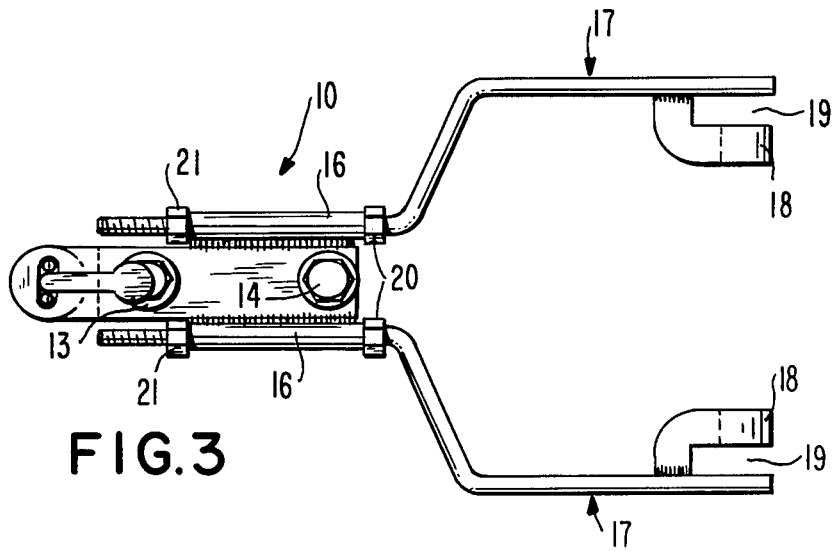
FIG. 3 is a top plan view of the invention, showing a ball hitch secured thereto.
Figure 4:
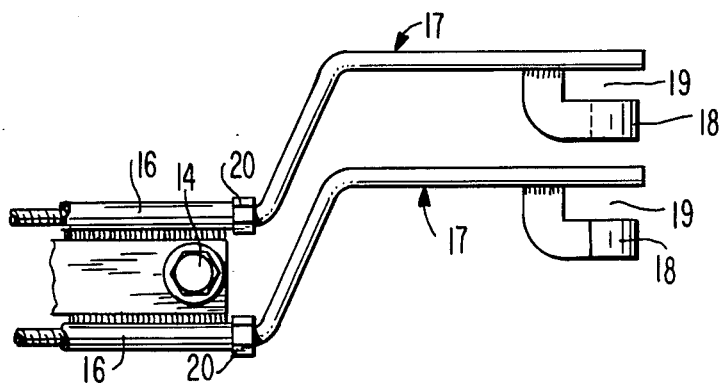
FIG. 4 is a fragmentary top plan view of the invention, shown folded.

Accordingly, a tow bar 10 is shown to include a main body 11 which is flat and includes a pair of spaced openings 12 for the mounting of a ball hitch 13 by a bolt 14 of a towing vehicle, not shown. Welds 15 secures sleeves 16, which are a pair, to the sides of main body 11, and the threaded ends of a pair of rods 17 are freely received in the sleeves 16. A hook 18 is welded to the end portions of each rod 17, for being received on the fork of the front wheel of the three-welded vehicle, and a space 19 is included at the rod 17 ends for providing greater clearance between the rods 17. The assembly of main body 11, the sleeves 16 and the rods 17, form a yoke in which the front wheel is received. The threaded ends of rods 17 receive a nut fastener 20, which engages with one end of the sleeves 16, and a second nut fastener 21 is received on the threads of rods 17, for keeping the rods 18 secured in the sleeves 16.

It shall also be recognized, that rods 17 are pivotal in the sleeves 16 for folding device 10 for compact storage after loosening the nut fasteners 21, and device 10 is also adaptable for use in towing large, manually powered, three-wheeled vehicles.

In use, the hooks 18 are placed on the end portions of the axle of the front wheel in the fork of the vehicle and the main body 11 is hitched to the towing vehicle by the ball hitch 13, so as to tow the three-wheeled vehicle.

While various changes may be made in the detail construction, it is understood that such changes will be within the spirit and scope of the present invention, as is defined by the appended claims.

What I now claim is:

1. A tow bar for a three-wheeled vehicle, comprising, an elongated main body having two longitudinal side edges and means for connecting said main body to a towing vehicle, a pair of sleeves secured to said main body, one of said pair of sleeves being fixedly secured to one longitudinal side edge of said main body and the other of said sleeves being fixedly secured to the other longitudinal side edge, a pair of rods, each rod having an externally threaded end which is freely received in a respective sleeve and a free end, each externally threaded end being selectively secured to a respective sleeve by fastener means, a pair of hooks, one hook being fixedly secured to a respective free end of each rod and adapted to engage respective end portions of a front wheel axle of a three-wheeled vehicle to be towed.

2. A tow bar as set forth in claim 1 wherein each said fastener means comprises a pair of nuts threaded on an externally threaded end of a respective rod, each sleeve being located between a respective pair of nuts.

3. A tow bar as set forth in claim 2 wherein said main body, said pair of rods, said pair of sleeves, and said pair of hooks, form yoke means that removably connect a towing vehicle to a front wheel axle of a three-wheeled vehicle to be towed.

4. A tow bar as set forth in claim 3 wherein in each fastening arrangement, loosening of a nut enables the rod to pivot in the respective sleeve and collapse said yoke means for compact storage.

* * * * *